US011138546B2

(12) United States Patent
Hanis et al.

(10) Patent No.: US 11,138,546 B2
(45) Date of Patent: Oct. 5, 2021

(54) TRACKING OBJECTS USING A TRUSTED LEDGER

(71) Applicant: International Business Machines Corporation, Armonk, NY (US)

(72) Inventors: Thomas T. Hanis, Raleigh, NC (US); Bruce H. Hyre, Cary, NC (US); Jessica G. Snyder, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 15/622,690

(22) Filed: Jun. 14, 2017

(65) Prior Publication Data

US 2018/0365633 A1    Dec. 20, 2018

(51) Int. Cl.
*G06Q 10/08* (2012.01)
*G06K 7/10* (2006.01)
*G06F 16/955* (2019.01)

(52) U.S. Cl.
CPC ....... *G06Q 10/0833* (2013.01); *G06F 16/955* (2019.01); *G06K 7/10366* (2013.01)

(58) Field of Classification Search
CPC .. G06Q 10/0833; G06Q 10/08; G06F 16/955; G06F 16/182; G06K 7/10366; H04L 9/06; H04L 2209/38
See application file for complete search history.

(56) References Cited

U.S. PATENT DOCUMENTS

| | | |
|---|---|---|
| 9,489,650 B2 | 11/2016 | Schoening |
| 2006/0122944 A1* | 6/2006 | Ryan ...................... G06Q 10/08 705/67 |
| 2009/0219170 A1 | 9/2009 | Clark et al. |
| 2011/0254664 A1 | 10/2011 | Sadr et al. |
| 2015/0222659 A1* | 8/2015 | Abou-Rizk ............. G01S 19/03 726/26 |
| 2016/0080380 A1* | 3/2016 | Dawoud Shenouda Dawoud ...... H04L 63/0823 713/156 |
| 2016/0098723 A1 | 4/2016 | Feeney |
| 2016/0253622 A1* | 9/2016 | Sriram .................. H04L 63/126 713/179 |
| 2016/0269182 A1 | 9/2016 | Sriram et al. |
| 2016/0275461 A1* | 9/2016 | Sprague ............. G06Q 20/0655 |
| 2016/0321654 A1 | 11/2016 | Lesavich et al. |
| 2017/0017936 A1 | 1/2017 | Bisikalo et al. |
| 2017/0337534 A1* | 11/2017 | Goeringer ............. H04L 9/3239 |
| 2018/0246676 A1* | 8/2018 | Schreter ................ G06F 3/0685 |

FOREIGN PATENT DOCUMENTS

GB          2451801 A       2/2009

OTHER PUBLICATIONS

Badzar, Amina, "Blockchain for securing sustainable transport contracts and supply chain transparency", May 24, 2016, Lund University, Department of Service Management and Service Studies, pp. 1-51 (Year: 2016).*

* cited by examiner

*Primary Examiner* — George Chen
*Assistant Examiner* — Wayne S. Murray

(57) ABSTRACT

A blockchain function may include one or more of receiving a last observed location identifier for a product identified via a product tag associated with the product, determining whether the last observed location identifier was received from a trusted source device, and storing the last observed location identifier in a blockchain with a confirmed status responsive to determining the last observed location identifier was received from the trusted source device.

17 Claims, 5 Drawing Sheets

TRACKING OBJECTS USING A TRUSTED LEDGER

TECHNICAL FIELD

This application generally relates to tracking objects, and more particularly, to tracking objects using a trusted ledger.

BACKGROUND

A blockchain may be used as a public ledger to store any type of information. Although, primarily used for financial transactions, a blockchain can store any type of information, including assets (i.e., products, packages, services, status, etc.) in its immutable ledger. A decentralized scheme transfers authority and trusts to a decentralized network and enables its nodes to continuously and sequentially record their transactions on a public "block," creating a unique "chain" referred to as the blockchain. Cryptography, via hash codes, is used to secure an authentication of a transaction source and removes the need for a central intermediary.

Locating and tracking an object across multiple, separate surveillance systems may be achieved by leveraging serialization tags, such as radio frequency identification (RFID). The ability to read and write data to the tags provides a way to track and update location information. By incorporating a method where the current surveillance system's location information is stored on the tag, along with that same surveillance system recording locally the previous location information from the tag, it is possible to work backwards to track the observed movement of the tagged object. This approach of a distributed tracking system could be used in a variety of applications in a supply chain, associate identification, commercial traffic pattern use cases, and other applications.

A fundamental notion of this approach is the premise that a singular global repository of tracked object location information is not always feasible. There are considerations for data and commercial privacy, security and risk associated with management of public data. Further, what is not addressed is how to determine the most recent observation, so there is a starting (i.e., last known observation) reference location.

SUMMARY

One example method of operation may include one or more of receiving a last observed location identifier for a product identified via a product tag associated with the product, determining whether the last observed location identifier was received from a trusted source device, and storing the last observed location identifier in a blockchain with a confirmed status responsive to determining the last observed location identifier was received from the trusted source device.

Another example embodiment may include an apparatus that includes a receiver configured to receive a last observed location identifier for a product identified via a product tag associated with the product, and a processor configured to perform one or more of determine whether the last observed location identifier was received from a trusted source device, and store the last observed location identifier in a blockchain with a confirmed status responsive to determining the last observed location identifier was received from the trusted source device.

Still another example embodiment may include a non-transitory computer readable storage medium configured store instructions that when executed cause a processor to perform one or more of receiving a last observed location identifier for a product identified via a product tag associated with the product, determining whether the last observed location identifier was received from a trusted source device, and storing the last observed location identifier in a blockchain with a confirmed status responsive to determining the last observed location identifier was received from the trusted source device.

DETAILED DESCRIPTION

Figure 1:
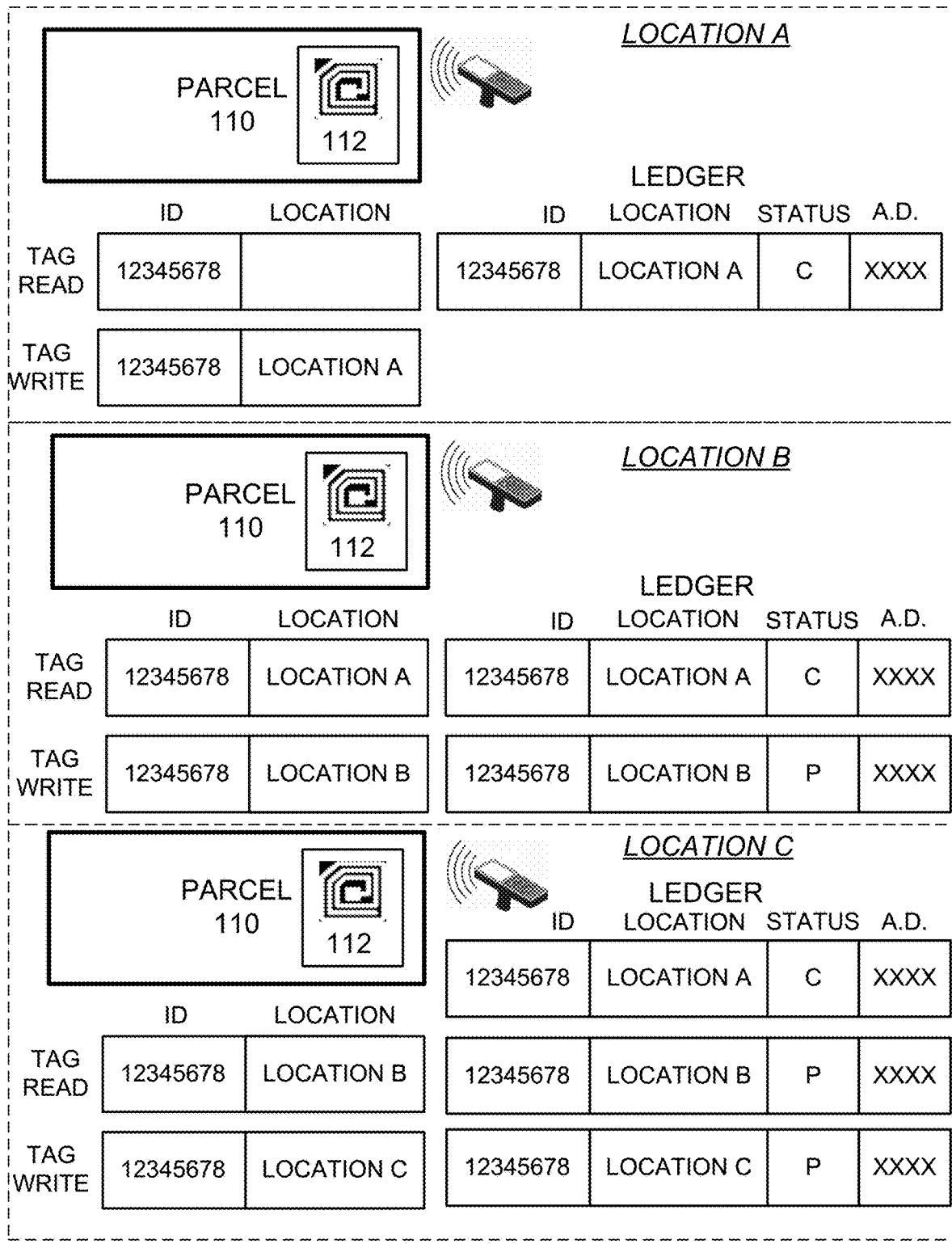
FIG. 1 illustrates a set of location identification operations and related location information and ledger updated information according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application, in one embodiment, relates to tracking objects in a trust ledger, and in another embodiment relates to identifying objects, such as parcels, periodically via tracking information stored in the ledger and determining whether the observers are trusted entities. The instant distributed system of shared information works well for a scenario in which a location where the tagged object was (last) observed is known, and where a retrace of the previous observations starting from that known point and working backwards in time is desired.

Example embodiments provide a trusted ledger, such as a blockchain, that contains a "last observation" of a tagged (serialized) object, which can be used as a starting point for a back-tracking operation to identify the products location (s). Serialized, in one example, refers to a serial ID number affixed to each tagged object. A tag can be a physical tag, i.e. a RFID tag. A trusted ledger may include the latest observation information about a tagged object, such as its location, and provide a mechanism by which updates to the ledger are only confirmed when the updates are made from a trusted source and the application supports the notion of trust and/or earned trust. The trust may be known or may be obtained and used to update the status of the device/site.

According to one example, only a trusted observer device can make permanent updates to the ledger, which provides a mechanism for trust to be earned in the system application. The approach may be described as a backward-pointing linked-list where, which includes a starting point (i.e., recent location transaction) and a chain of observation systems, such as RFID readers or other computing devices which identify and forward or log location information at participating locations which read and track object RFID tags. At each point in the 'chain', any specific location has access to where the tag was previously identified when observed. This provides the capability to query system-by-system results until the object's tracked history is fully exposed. The ledger could be queried by anyone with proper authority, but can only be updated by trusted observers/devices.

Other features include creating a common ledger to contain a reference to the last (most recent) observation, ensuring that only a trusted observer can make permanent updates to the ledger, and providing a mechanism for trust to be earned in the system. The ledger will contain, in one embodiment, one entry for any given serialized tag ID. If a ledger update is requested by an observer/device and that tag ID is already in the ledger, then the ledger entry will be updated. If a previous entry does not exist, then a new entry will be created. An exception to this at-most-one-entry rule is for the case of untrusted observers where entries can be provisionally added and will only replace the current entry when the observer earns "trusted" status. In this approach, all ledger requests including updates will only be accepted from trusted requestors. If the observers are assumed to be trusted, then a sequence of tagged object observations, at a sequence of different locations, will receive a new status from each update of each trusted observer, as a recorded "Confirmed" or "C" parameter.

The ledger code will validate a user request against a dynamically updating list of trusted observers. If the observer is trusted, then the ledger request will be executed and the update will be confirmed. If the observer is not trusted (unknown), then the request will be logged to the ledger but will be marked as pending. The request may be different from the location update since a request is not actually a location update. The pending requests will not also not overwrite any existing ledger entries since they are requests and not actual location updates. After, a trust is earned, any pending updates from that particular observer/device will be validated and the appropriate ledger updates will be resolved so that appropriate overwrites may occur and any pending updates are fully committed to the ledger.

FIG. 1 illustrates a set of location identification operations and related location information and ledger updated information according to example embodiments. Referring to FIG. 1, the configuration 100 includes three different locations (A, B, C) where a parcel 110 is scanned or identified via a bar code reader, a RFID tag identifier, a NFC tag identifier, a Bluetooth identifier or any other identification procedure which could be used to identify a parcel/box/product, etc. The approach used in this example is a RFID tag 112 read by a tag reading device. The first location 'A' may read a tag ID and then write to a ledger, or computing memory that the tag ID is associated with a particular location 'A'. As a result, the ledger may be updated to include the ID, location, and status (i.e., Confirmed 'C' or Pending 'P'). In this example, only location 'A' is a trusted location, which may include a trusted observer name, a trusted observer device, or any other trusted status indicator. The locations 'B' and 'C' are not trusted at the time of the location status updates and the respective ledger updates being made to the trusted ledger.

Trust validation may be based on various criteria. A properly conforming observation system will perform several functions. For instance, during an observation of a tagged object it will update both the ledger and the tag itself. Additionally, it will provide a query-ready interface to respond to the previously known observation location for a given tag ID. With the responsibilities known, the trusted ledger system can dynamically decide to validate properly behaving and "trusted" observers over time. Allocating value to verifiable systems will permit the dynamic adaptation of observer systems reaching certain requirement thresholds and moving from an untrusted to a trusted status based on the established requirements being achieved. The valuation, thresholds and status levels may be usage scenario dependent. In one example, observers may become validated by obtaining a threshold number of observations of object(s) by trusted observers after the observations are performed by untrusted observers and/or a threshold number of successful back-trace queries being performed that correlate from untrusted observers but which are linked to trusted observers. To gain trust, a threshold number of observations of object(s) must be performed by trusted observers after the observations by untrusted observers, or a threshold number of successful back-trace queries must be identified that flow from untrusted to trusted observers.

In other examples, trust can be earned by ledger updating systems (observers) through third party validation, eco-system voting, multi-ledger consensus, and other approaches used to arrive at a decision to add an observer to the trust group of trusted entities. Referring to FIG. 1, once a trust is established, a new transaction is written to the trusted ledger with the location(s) that is now trusted and with a status of 'C', instead of 'P'. For instance, locations 'B' and 'C' may be trusted at a later time based on an earned trust, so the pending status 'P' of those locations may be changed to confirmed 'C' and an overriding notification is created and stored in the shared ledger for verification by all interested parties. The last known and trusted source location information will be retrieved from the blockchain, trusted ledger or shared ledger which will include the most recent/last known location information. Location information can be back-traced through the system. Back-tracing is a backwards movement in time across various entities, so the most recent location is in the shared ledger. The most recent recorded transaction may be considered valid, as long as the ledger eventually shows 'C' and the transaction is confirmed.

Figure 2:
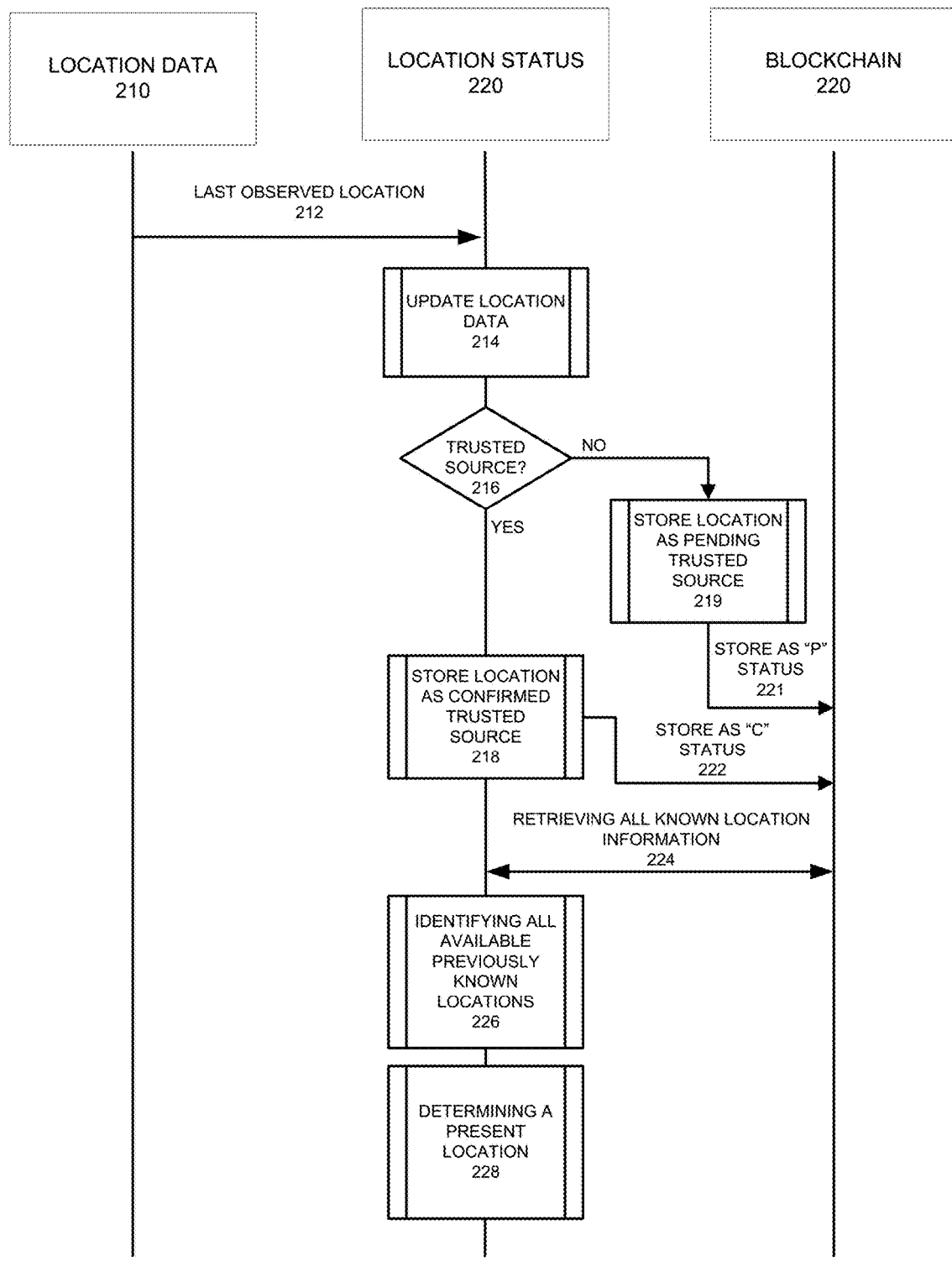
FIG. 2 illustrates a system signaling diagram of the interactions between a location identification device and a blockchain according to example embodiments.

FIG. 2 illustrates a system signaling diagram 200 of the interactions between a location identification device and a blockchain according to example embodiments. Referring to FIG. 2, the system 200 may include a number of components or modules which may include software, hardware or a combination of both. The components may include a first component, such as location data 210 may represent data provided by a trusted or untrusted device. The data is received periodically 212 as a last observed location or other location data at a second component such as a location status 220 module, memory and/or device. The location data may be updated 214 and a determination may be made as to whether the source is trusted or untrusted 216. If the source is not trusted, the location information is stored 219 as pending 221 in a third component such as a blockchain 230. If the source is trusted then the location is stored 218 as confirmed 222. All the known location information 224 may be retrieved at any time to identify a series of location points. The location 226 may provide a trail or chain of locations to provide help when identifying a present location 228. Any modifications to the status may also be updated to include a new transaction in the blockchain.

In one embodiment, the first component, the second component and the third component may be separate devices such as servers, computers or other computational devices or may be a single device. In other embodiments, the first component and the second component may be enclosed as, or perform as, a single device, the first component and the third component may be enclosed as, or perform as, a single device, and the second component and the third component may be enclosed as, or perform as, a single device. The components or devices 210, 220 and 230 may be directly connected or communicably coupled to one another, in a wired or wireless manner, and may reside locally and/or remotely.

Figure 3A:
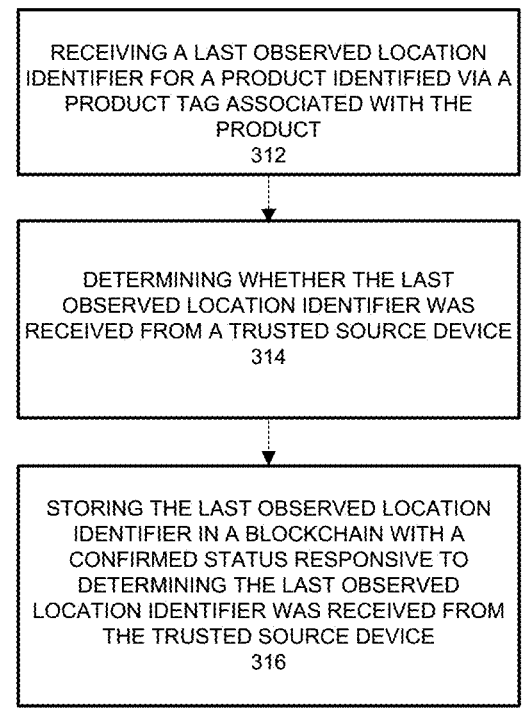
FIG. 3A illustrates a flow diagram of an example method of managing transaction ordering in the blockchain according to example embodiments.

FIG. 3A illustrates a flow diagram 300 of an example of managing transaction ordering in a blockchain according to example embodiments. Referring to FIG. 3A, the example may include one or more of: receiving a last observed location identifier for a product identified via a product tag associated with the product 312, determining whether the last observed location identifier was received from a trusted source device 314, and storing the last observed location identifier in a blockchain with a confirmed status responsive to identifying the last observed location identifier was received from the trusted source 316. The last observed location identifier may be received within a designated time frame window and may identify a location of the product during the designated time frame window. The time window may be a set amount of time during which a particular observer had retained custody over the parcel or a maximum amount of time by which the custody could have been permitted. The method may also include retrieving one or more additional last observed location identifiers associated with the product, determining a plurality of last observed locations stored in the blockchain, and tracking a product route of the product based on the plurality of last observed locations. The method may further include determining the last observed location identifier was received from an untrusted source device, determining whether to start trusting the untrusted source device, and storing the last observed location identifier in the blockchain responsive to determining the untrusted source qualifies as a new trusted source. The method may also include determining whether to start trusting the untrusted source device by identifying the untrusted source device on an updated list of trusted source devices. The method may further include determining the last observed location identifier was received from an untrusted source device, storing the last observed location identifier as a pending status, changing the last observed location identifier to a confirmed status if the untrusted source device becomes a new trusted source device, and discarding the last observed location identifier if the untrusted source device does not become the new trusted source device. The method may also include, when the last observed location identifier is changed to a confirmed status, overwriting a previously stored last observed location identifier with the last observed location identifier.

Figure 3B:
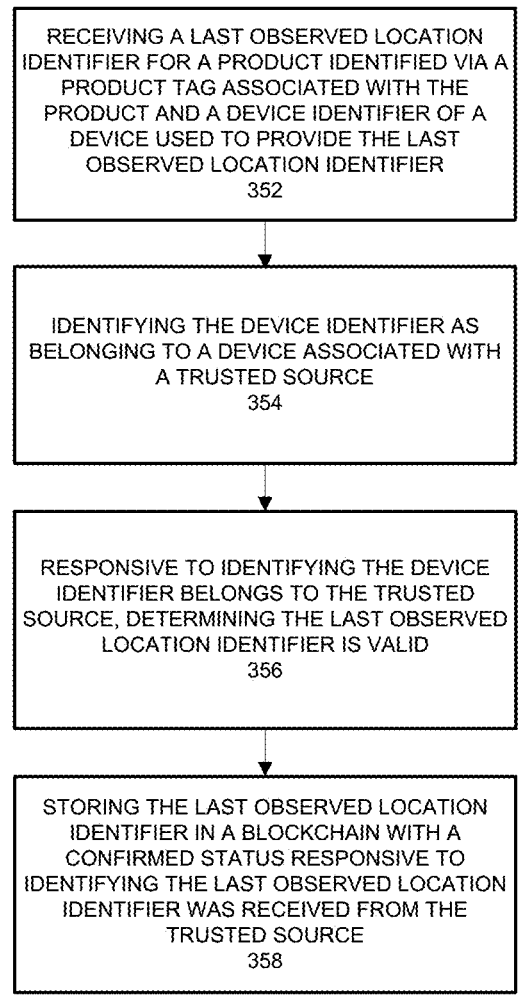
FIG. 3B illustrates another flow diagram of an example method of managing transaction ordering in the blockchain according to example embodiments.

FIG. 3B illustrates another flow diagram 350 of an example of managing transaction ordering in a blockchain according to example embodiments. In this example, one or more of the following may occur: receiving a last observed location identifier for a product identified via a product tag associated with the product and a device identifier of a device used to provide the last observed location identifier 352, identifying the device identifier as belonging to a device associated with a trusted source 354, responsive to identifying the device identifier belongs to the trusted source, determining the last observed location identifier is valid 356, and storing the last observed location identifier in a blockchain with a confirmed status responsive to identifying the last observed location identifier was received from the trusted source 358.

In this example, the device or devices which provide the last observed location identifier are linked to the information provided to the tracking system. For example, the location identifier provides location information and the device identifier uniquely identifies the device which received the location information, such as a hardware address, a dynamic network address, a model number, an assigned identifier, etc. The information may be recognizable to the tracking system based on a device list, device characteristic databank with acceptable parameters or other predefined screening criteria.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
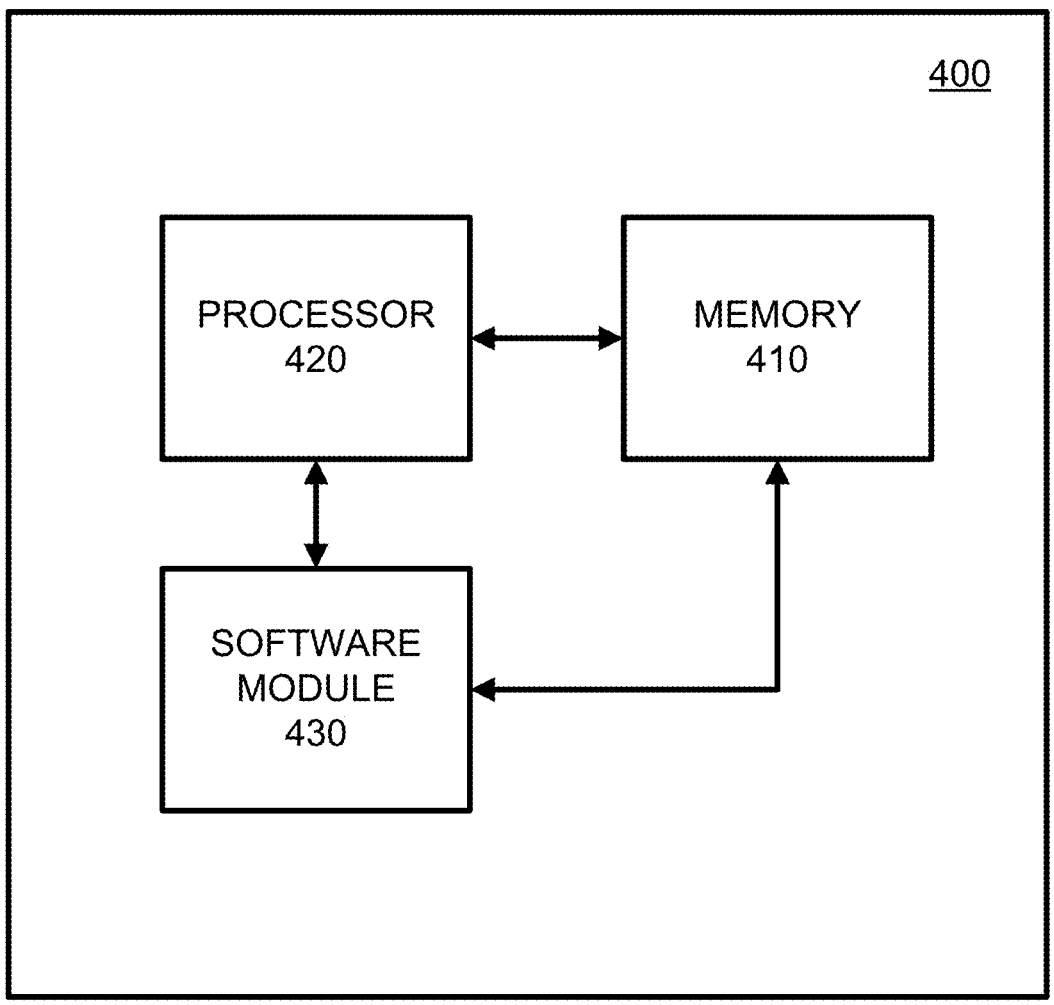
FIG. 4 illustrates an example network entity configured to support one or more of the example embodiments.

As illustrated in FIG. 4, a memory 410 and a processor 420 may be discrete components of a network entity 400 that are used to execute an application or set of operations as described and depicted herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that the "system" or one or more components or elements of the instant application could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, with steps that are combined, with steps that are omitted, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application, in one embodiment, should be defined by the appended claims when considered with a full range of equivalents and modifications (e.g., protocols, hardware devices, software platforms etc.) thereto.

What is claimed is:

1. A method, comprising:
   receiving, by a blockchain ledger, a last observed location identifier for a product identified via a tag associated with the product, the tag identifying that the last observed location identifier is from an untrusted source device;
   storing, by the blockchain ledger, the last observed location identifier with a status indicator indicating that the last observed location identifier has a pending status indicating that the last observed location identifier is not committed to the blockchain ledger;
   receiving, by the blockchain ledger, an indication of whether the untrusted source device is now a trusted source device;
   changing, by the blockchain ledger, the status indicator to indicate that the last observed location identifier has a confirmed status based on the indication indicating that the untrusted source device is now a trusted source device; and
   committing the confirmed last observed location identifier to the blockchain ledger.

2. The method of claim 1, wherein the receiving the last observed location identifier further comprises:

receiving the last observed location identifier within a designated time frame window; and identifying a location of the product during the designated time frame window.

3. The method of claim 1, further comprising:

storing, by the blockchain ledger, the indication for verification.

4. The method of claim 1, wherein the indication that the untrusted source device is now a trusted source device is created using an updated list of trusted source devices.

5. The method of claim 1, further comprising:

removing, by the blockchain ledger, a last observed location identifier having a pending status, if the untrusted source device does not become the trusted source device.

6. The method of claim 5, further comprising:

when the last observed location identifier is changed to a confirmed status, overwriting, by the blockchain ledger, a previously stored last observed location identifier with the last observed location identifier.

7. An apparatus for implementing a blockchain, the apparatus comprising:

a memory to store one or more instructions; and a processor to execute the one or more instructions to cause a blockchain ledger of the blockchain to:

receive a last observed location identifier for a product identified via a tag associated with the product, the tag identifying that the last observed location identifier is from an untrusted source device, store the last observed location identifier with a status indicator indicating that the last observed location identifier has a pending status indicating that the last observed location identifier is not committed to the blockchain, receive an indication of whether the untrusted source device is now a trusted source device, change the status indicator to indicate that the last observed location identifier has a confirmed status based on the indication indicating that the untrusted source device is now a trusted source device, and commit the confirmed last observed location identifier to the blockchain.

8. The apparatus of claim 7, wherein, when the processor is to receive the last observed location identifier, the processor further is to:

receive the last observed location identifier within a designated time frame window; and identify a location of the product during the designated time frame window.

9. The apparatus of claim 7, wherein the processor is further configured to:

store the indication for verification in the blockchain ledger.

10. The apparatus of claim 7, wherein the indication that the untrusted source device is now a trusted source device is created using an updated list of trusted source devices.

11. The apparatus of claim 7, wherein the processor is further configured to:

remove, from the blockchain ledger, a last observed location identifier having a pending status, discard the last observed location identifier if the untrusted source device does not become the trusted source device.

12. The apparatus of claim 11, wherein the processor is further configured to:

when the last observed location identifier is changed to a confirmed status, overwrite, by the blockchain ledger, a previously stored last observed location identifier with the last observed location identifier.

13. A non-transitory computer readable storage medium configured to store one or more instructions that when executed by a processor cause the processor to perform:

receiving, by a blockchain ledger, a last observed location identifier for a product identified via a tag associated with the product, the tag identifying that the last observed location identifier is from an untrusted source device;

storing, by the blockchain ledger, the last observed location identifier with a status indicator indicating that the last observed location identifier has a pending status indicating that the last observed location identifier is not committed to the blockchain ledger;

receiving, by the blockchain ledger, an indication of whether the untrusted source device is now a trusted source device;

changing, by the blockchain ledger, the status indicator to indicate that the last observed location identifier has a confirmed status based on the indication indicating that the untrusted source device is now a trusted source device; and committing the confirmed last observed location identifier to the blockchain ledger.

14. The non-transitory computer readable storage medium of claim 13, wherein the receiving the last observed location identifier further comprises:

receiving the last observed location identifier within a designated time frame window; and identifying a location of the product during the designated time frame window.

15. The non-transitory computer readable storage medium of claim 13, wherein the one or more instructions are further configured to cause the processor to perform:

storing, by the blockchain ledger, the indication for verification.

16. The non-transitory computer readable storage medium of claim 13, wherein the indication that the untrusted source device is now a trusted source device is created using an updated list of trusted source devices.

17. The non-transitory computer readable storage medium of claim 13, wherein the one or more instructions are further configured to cause the processor to perform:

removing, by the blockchain, a last observed location identifier having a pending status, if the untrusted source device does not become the trusted source device; and when the last observed location identifier is changed to a confirmed status, overwriting, by the blockchain, a previously stored last observed location identifier with the last observed location identifier.

\* \* \* \* \*